May 13, 1969     F. KENNEDY     3,443,527
RESILIENTLY SUPPORTED RAILWAY CAR WHEEL DRIVE MECHANISM
Filed Feb. 13, 1967
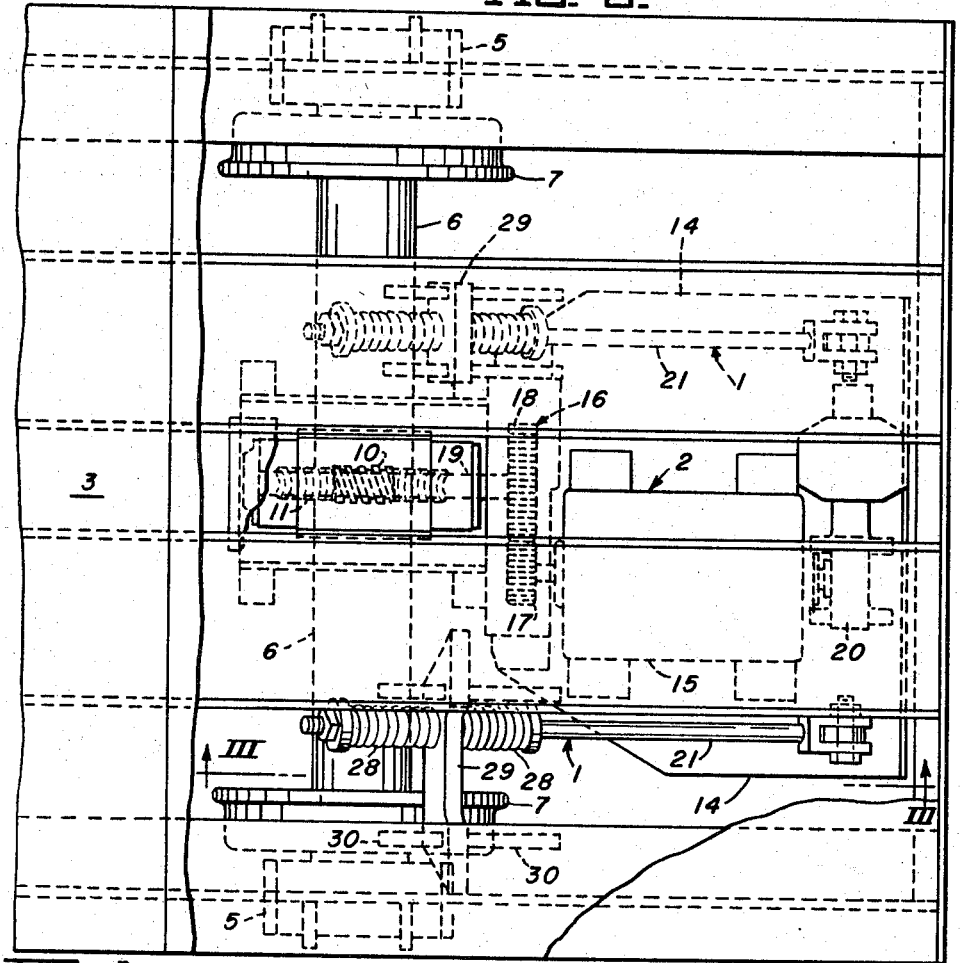
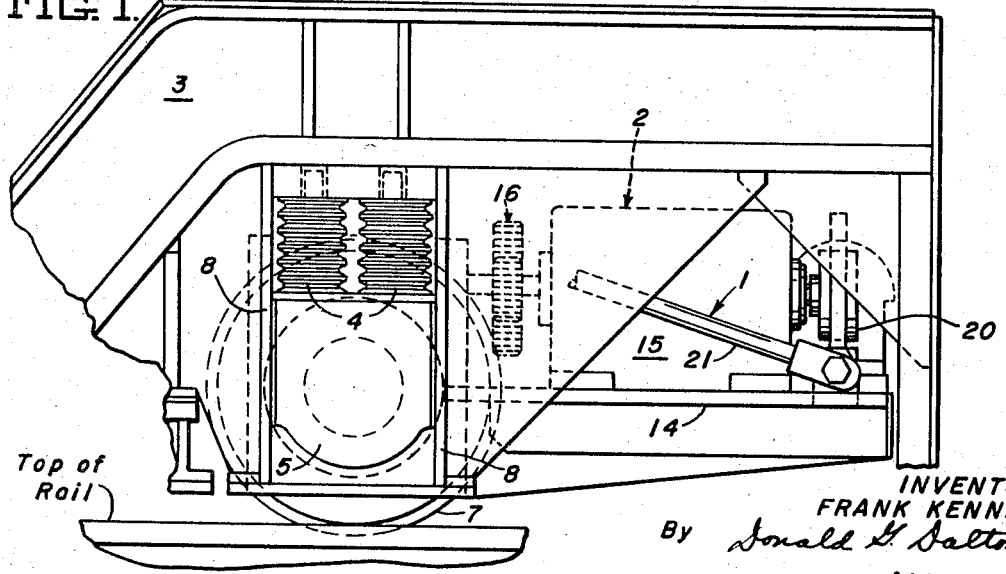
INVENTOR.
FRANK KENNEDY
By Donald G. Dalton
Attorney

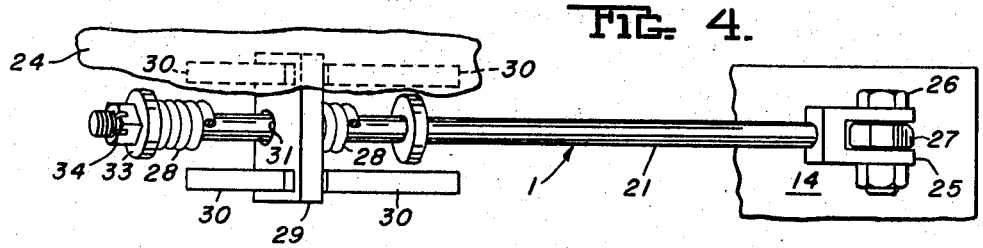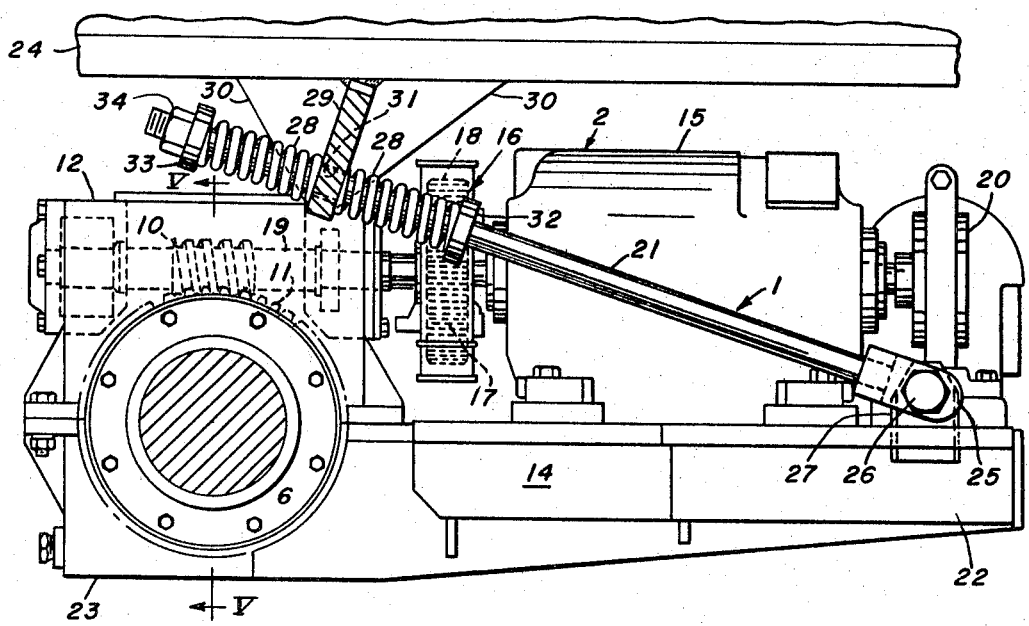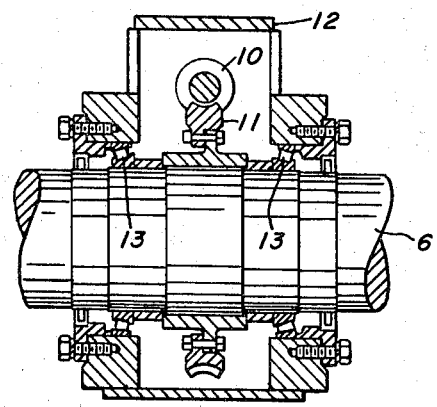

United States Patent Office 3,443,527
Patented May 13, 1969

3,443,527
RESILIENTLY SUPPORTED RAILWAY CAR WHEEL DRIVE MECHANISM
Frank Kennedy, Johnstown, Pa., assignor to United States Steel Corporation, a corporation of Delaware
Filed Feb. 13, 1967, Ser. No. 615,624
Int. Cl. B61c 7/00; B61f 5/30
U.S. Cl. 105—136                                                6 Claims

ABSTRACT OF THE DISCLOSURE

An axle drive for railway cars having a gear reducer drive unit rotatably supported at one end on the car axle and a torque arm suspension therefor in the form of a resiliently extensible linkage system having horizontally space connections respectively with the reducer unit and with the car, its connection with the reducer unit being at a point spaced outwardly with respect to the axle and its connection with the car being at a point spaced vertically above the axle.

---

This invention, as indicated, relates to a railway car axle drive and, more particularly, to a torque suspension of improved construction for a gear reducer drive unit which is rotatably supported at one end on the car axle. In a manner to be described, the torque suspension of this invention comprises a resilient linkage system that has horizontally spaced connections at its opposite ends respectively with said gear reducer drive unit and with the car at a point located vertically above the car axle, which render it effective to hold the reducer unit against pivotal movement on the axle from a normal horizontal position while providing for vertical springing movement of the car relative to the axle.

In axle drives for railway cars, the vertical springing movement of the cars relative to their wheel and axle assemblies requires that the driving force be transmitted to the axle either through drive shafts and universal couplings, or by a gear reducer unit that is pivotally supported at one end on the car axle. When the axle drive is effected through a pivotally supported gear reducer drive unit, a torque arm suspension for holding the unit against pivotal movement is required to render it effective for transmitting torque and to provide for vertical springing movement of the car relative to its wheel and axle assembly. Conventional torque arm suspensions of this character customarily employ a vertical torque arm that is located at the opposite and outer end of the drive unit, and has vertically spaced connections at its upper and lower ends with the car and with the drive unit. In suspensions of this type the length of the drive unit between the axle and the vertical torque arm is effective 'as a lever arm through which the vertical force on the torque arm is applied to the axle drive gear.

One of the objects of this invention is, accordingly, to provide an improved torque arm suspension for gear reducer drive units that are pivotally supported on a car axle which is effective to reduce the vertical force component transmitted to the axle gearing.

A further object of the invention is to provide a torque arm suspension of the character referred to above in which the pivotal movement of the gear reducer drive unit is controlled by a resilient linkage system in the form of a horizontally inclined rod having a pivotal connection at its lower end with the outer end of the gear reducer drive unit, and a resilient connection at its upper end with the railway car at a point vertically above the axle on which the drive unit is pivotally supported.

Other objects and advantages of the invention will become apparent from the following description.

In the drawings there is shown a preferred embodiment of the invention. In this showing:

FIGURE 1 is a fragmentary side elevational view of one end of a railway car showing the manner in which the resilient linkage suspension of this invention is applied to a gear reducer drive unit for a railway car axle;

FIGURE 2 is a plan view of the railway car shown in FIGURE 1 which shows the general arrangement of the gear reducer drive unit with respect to the wheel and axle assembly on which the car is supported;

FIGURE 3 is a view taken substantially along the lines III—III of FIGURE 2, which shows in elevation the linkage system of this invention;

FIGURE 4 is a plan view illustrating in greater detail the arrangement of the linkage system of this invention with respect to and at one side of the axle drive unit; and FIGURE 5 is a sectional view taken along the lines V—V of FIGURE 3.

The drawings show the manner in which the torque arm suspension 1 of this invention is applied to a gear reducer drive unit 2 for a railway car 3, which is supported by springs in the form of a pair of rubber pads 4 on journal housings 5 at opposite ends of an axle 6. The path of springing movement of the car 3 relative to the axle 6 and the railway wheels 7 keyed thereon is defined by guides 8 at opposite sides of the journals 5 in which the journals 5 have guided vertical movement.

The drive unit 2 is conventional and as best shown in FIGURES 3 and 5 comprises a drive worm 10 in meshing engagement with a worm wheel 11 on the axle 6, and a housing 12 which is rotatably supported on the axle 6 by a pair of bearings 13 at opposite sides of the worm wheel 11. A platform 14 is rigidly connected with the housing 12 for pivotal movement therewith about the axle 6. The platform 14 extends horizontally and radially outwardly with respect to the axle 6 and furnishes a support for a drive motor 15 which is mounted on the upper surface thereof and is connected through speed reducing gearing 16 and the worm 10 in driving relation with the axle 6. The gearing 16 comprises a pinion 17 which is keyed to the motor drive shaft and has meshing engagement with a gear 18 on the drive shaft 19 for the worm 10. A magnetic brake 20 for the motor drive shaft is also mounted on the platform 14. For purposes of definition, the term "gear reducer drive unit" as used herein includes the platform 14, the housing 12, and all of the elements connecting the motor 15 in driving relationship with the axle 6.

The torque arm suspension 1 of this invention comprises a pair of identical resilient linkage systems at opposite sides of the platform 14. Each of such linkage systems, as best shown in FIGURES 3 and 4, comprises a rod 21 which extends horizontally and has a downward angular inclination in a direction rearwardly with respect to the axis of the wheel 7 as viewed in these figures. Opposite ends of each rod 21 has spaced horizontal articulated connections, in a manner to be described, respectively with the trailing end 22 of the gear reducer drive unit 2, the forward end 23 of which is pivotally supported by the housing 12 and bearings 13 on the axle 6, and with the frame 24 of the body 3 at a point over the axle 6.

The connection of the lower end of each rod 21 with the trailing end 22 of the unit 2 comprises a clevis 25 that is pivotally connected with a pin 26 carried by a bracket 27 on the platform 14. The clevis pin connections 25–27 for the rods 21 thus provide for their pivotal movement about the common axis of the pins 26, which is parallel to the axis of the axle 6, in response to springing movement of the car 3.

The connections of the opposite and upper ends of each rod 21 with the car body 24 are resilient connections which are respectively formed by a pair of coil springs 28 wound on each rod 21 in spaced positions on opposite sides of a plate 29 with which adjacent ends of such springs have bearing engagement. The plates 29 are rigidly secured by welding to the car body 24 and to bracing plates 30 on opposite sides thereof in vertically inclined positions normal to the axes of the rods 21. The plates 29 have openings 31 through which the rods 21 extend for axial movement with respect thereto when vertical movement of the plates 29 takes place in response to vertical springing movement of the car 3. The opposite or remote ends of the springs 28 have bearing engagement respectively with a collar 32 rigidly secured to the rod 21 and with a washer 33 which is slidable on the upper end thereof. Adjustment of the axial positions of the washers 33, and thereby the compression of the springs 28, is effected by nuts 34 threaded on the upper ends of the rods 21. The springs 28 operate through the rods 21 to provide a resilient suspension for the platform 14 and thereby the gear reducer unit 2 on the car body 24. This suspension is effective to hold the gear reducer unit 2 against pivotal movement with respect to the axle 6 and in the relative horizontal position shown in the drawings.

In operation, starting and braking torques applied to the axle 6 develop forces that tend to rotate the unit 2 about the axle 6 and are transmitted through the rods 21 to the springs 28, which are compressed and operate as stated above to hold the unit 2 against rotational movement relative to the axle 6. When vertical springing movement of the car takes place, the plates 29 move vertically with the car body 3 and cause the rods 21 to pivot about the clevis pins 26. This pivotal movement of the rods 21 takes place with a minimum of axial movement of the rods 21 in the bracket openings 31, since the arcuate path of movement of the portions of the rods within the bracket openings 31 is substantially vertical and practically coincides with the path of vertical movement of the plates 29. In this manner the torque suspension of this invention provides for springing movement of the car body with a minimum of pivotal movement of the drive unit 2 relative to axle 6 thereby reducing the consequent transmission of vertical forces acting adversely to the worm gearing in the housing 12.

While one embodiment of my invention has been shown and described, it will be apparent that adaptations and modifications may be made without departing from the appended claims.

I claim:

1. In a drive for a railway car supported for springing movement on a wheel and axle assembly, the combination with a gear reducer drive unit extending radially and horizontally outwardly with respect to the axle of said assembly and having a driving connection therewith, and means supporting one end of said unit for pivotal movement on said axle, of resilient linkage means comprising a rod having articulated connections at opposite ends thereof including a first connection with said unit at a point spaced horizontally outwardly and remotely with respect to said axle and a second connection with said car at a point adjacent and above said axle, said linkage means operating to suspend said unit in a substantially horizontal position while providing for vertical springing of said car relative to said axle.

2. A railway car drive as defined in claim 1 characterized by the said point of said second connection being between said axle and said first connection.

3. A railway car drive as defined in claim 1 characterized further by said first connection comprising a pivotal connection providing for pivotal movement of said rod with respect to said unit about an axis spaced from and parallel to said axle.

4. A railway car drive as defined in claim 3 characterized further by said second connection comprising a bracket support secured to said railway car and having an opening through which said rod extends, and means resiliently holding said rod against endwise movement in said bracket supporting opening.

5. A railway car drive as defined in claim 4 characterized further by said resilient holding means comprising a pair of coil springs respectively arranged on opposite sides of said bracket support, said springs having adjacent ends thereof in bearing engagement with said bracket support, and spaced means on said rod for bearing engagement with the opposite ends of said springs.

6. A railway car drive as defined in claim 5 characterized by there being a pair of said resilient linkage means respectively arranged on opposite sides of said gear reducer unit in axially spaced positions relative to said axle.

References Cited

UNITED STATES PATENTS

| 426,658 | 4/1890 | Brill | 105—139 |
| 801,448 | 10/1905 | Fellner | 105—139 X |
| 1,612,346 | 12/1926 | Aspinwall | 105—139 X |

FOREIGN PATENTS 44,115  6/1927  Norway.

ARTHUR L. LA POINT, *Primary Examiner.*

HOWARD BELTRAN, *Assistant Examiner.*

U.S. Cl. X.R.

105—96, 139